US006802121B2

(12) United States Patent
Fuganti et al.

(10) Patent No.: US 6,802,121 B2
(45) Date of Patent: Oct. 12, 2004

(54) METHOD FOR PRODUCING A CYLINDER BLOCK FOR AN INTERNAL COMBUSTION ENGINE

(75) Inventors: Antonio Fuganti, Orbassano (IT); Paolo Barban, Torino (IT); Ezio Merlo, Torino (IT); Stefano Plano, Torino (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

(21) Appl. No.: 10/203,415

(22) PCT Filed: Feb. 1, 2001

(86) PCT No.: PCT/IT01/00048

§ 371 (c)(1), (2), (4) Date: Aug. 9, 2002

(87) PCT Pub. No.: WO01/58621

PCT Pub. Date: Aug. 16, 2001

(65) Prior Publication Data

US 2003/0000086 A1 Jan. 2, 2003

(30) Foreign Application Priority Data

Feb. 1, 2001 (IT) .................................... TO2000A0130

(51) Int. Cl.[7] ................................................ B23P 15/00

(52) U.S. Cl. ................................ 29/888.061; 29/888.01

(58) Field of Search ....................... 29/888.01, 888.061; 164/98, 99, 100, 91; 123/193.5, 193.2

(56) References Cited

U.S. PATENT DOCUMENTS

| | | | | | |
|---|---|---|---|---|---|
| 5,232,041 | A | * | 8/1993 | Kuhn | 164/105 |
| 5,357,921 | A | * | 10/1994 | Katoh et al. | 123/193.2 |
| 5,755,028 | A | * | 5/1998 | Takami et al. | 29/888.06 |
| 5,860,469 | A | * | 1/1999 | Barlow | 164/98 |
| 6,148,515 | A | * | 11/2000 | Suzuki et al. | 29/888.06 |
| 6,286,210 | B1 | * | 9/2001 | Ruckert et al. | 29/888.061 |

FOREIGN PATENT DOCUMENTS

| | | | |
|---|---|---|---|
| DE | 19 17 882 | A | 10/1970 |
| DE | 44 34 576 | A | 2/1996 |
| DE | 197 53 017 | A | 6/1999 |
| DE | 19753017 | * | 6/1999 |
| JP | 59 066 918 | A | 4/1984 |
| JP | 08 290 255 | A | 11/1996 |

* cited by examiner

*Primary Examiner*—Irene cuda-Rosenbaum
(74) *Attorney, Agent, or Firm*—Sughrue Mion, PLLC

(57) ABSTRACT

Method for making a cylinder block for internal combustion engine, in which at least one cylinder liner (10) is arranged inside a mould and aluminium-based material is cast into the mould and cooled, so that the cylinder liner (10) is incorporated in the cylinder block. The cylinder liner (10) is made of aluminium-based material and has protuberances destined to melt in contact with the molten material cast into the mould arranged on its external surface.

4 Claims, 1 Drawing Sheet

METHOD FOR PRODUCING A CYLINDER BLOCK FOR AN INTERNAL COMBUSTION ENGINE

This is a National stage entry under 35 U.S.C. §371 Application No. PCT/IT01/00048 filed Feb. 1, 2001; the disclosure of which is incorporated herein by reference.

BACKGROUND OF THE INVENTION

DESCRIPTION

This invention relates to a method for the production of a cylinder block for an internal combustion engine for motor vehicle. More precisely, this invention relates to a method in which at least one cylinder liner is arranged in a mould and aluminium-based material is cast into the mould and cooled so that the cylinder liner is incorporated in the cylinder block.

In a known solution, the cylinder liners are made of cast iron, or other material, which melting point is considerably higher than that of the aluminium-based material forming the cylinder block. In this case, there is no risk of damaging the cylinder liners while casting the material destined, once solidified, to form the cylinder block.

Technically more advanced solutions envisage the use of cylinder liners made of aluminium-based material, such as, for example, hypereutectic aluminium alloys or composite aluminium alloys reinforced with ceramic particles (silicon carbide, alumina, ceramic fibres, etc.). With reference to cast iron cylinder liners, aluminium liners present the advantage of being lighter in weight and permitting the construction of an engine which consumes less oil, because the aluminium liners have an expansion coefficient which is much closer to that of the aluminium pistons. For this reason, during operation of an internal combustion engine fitting aluminium liners, the variation in play between the piston and the internal surface of the respective cylinder liner is lower.

The production of cylinder blocks with cylinder liners incorporated by casting poses various problems. The cylinder liners usually produced by extrusion normally present an external layer of alumina due to the oxidation of the aluminium-based material in the presence of oxygen. A metallurgic bond between the cylinder liners and the cylinder block cannot be obtained if cylinder liners coated with a layer of alumina are incorporated in the molten material which is destined to form the cylinder block, because the alumina layer(which fusion temperature is considerably higher than that of the aluminium alloys) forms a barrier between the cylinder liners and the material forming the cylinder block. With the alumina barrier, the bond between the cylinder liner and the cylinder block is only mechanical, while a metallurgical bond concerning at least of a part of the contact surface between cylinder liner and cylinder block would be desirable.

SUMMARY OF THE INVENTION

The applicant experimented a method consisting in removing the alumina layer by turning immediately before arranging the cylinder liners in the mould. However, this method introduces an additional cost related to the turning process. Furthermore, experimental experience demonstrates that without the alumina layer the cylinder liners can be damaged when the molten material destined to form the cylinder block is cast. Specifically, the formation of localised fusion of the cylinder liners was found near the mould casting channels.

The purpose of this invention is to describe a method for the production of a cylinder block with aluminium liners which are not effected by said problems and which permits the creation of a metallurgic bond along at least a part of the contact surface between liner and cylinder block.

According to this invention, this purpose is reached by means of a method which characteristics are described in the main claim.

BRIEF DESCRIPTION OF THE DRAWINGS

This invention will be better explained by the following detailed descriptions with reference to the accompanying figure as non-limiting example, whereas.

DETAILED DESCRIPTION OF THE INVENTION

With reference to the figures, number 10 indicates a cylinder liner according to this invention. The liner 10 is made of aluminium-based material, such as, for example, hypereutectic aluminium alloy, aluminium-based metallic matrix composite material, for example reinforced with ceramic particles or fibres.

A plurality of protuberances 12, which extend in the longitudinal direction for the entire length of the liner, forming respectively parallel and equidistant ribbings, are formed on the external surface of the liner 10. The liner 10 is obtained by means of extrusion according to a known method.

Figure 1:
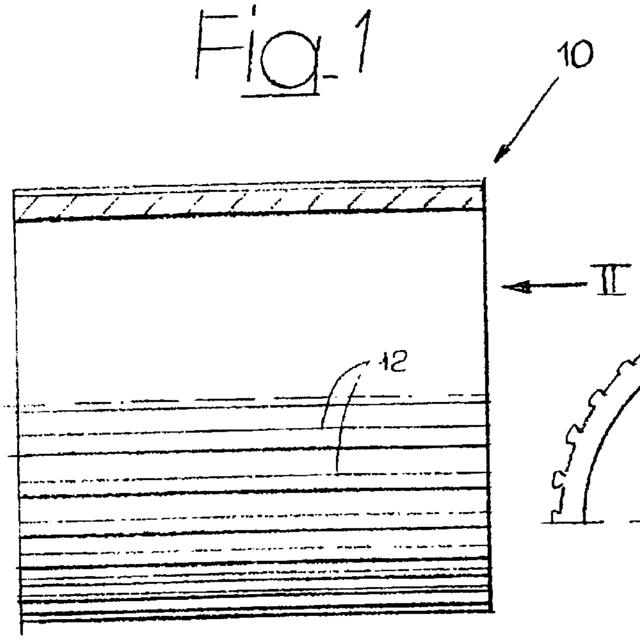
FIG. 1 is a schematic lateral view of a cylinder liner according to this invention.
Figure 2:
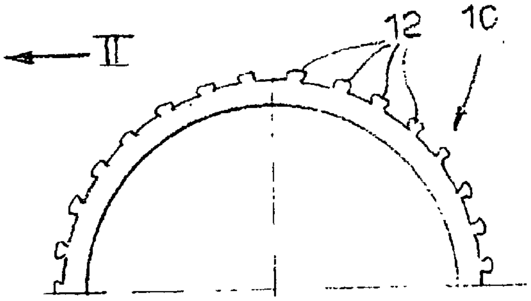
FIG. 2 is a partial view according to arrow II in FIG. 1.
Figure 3:
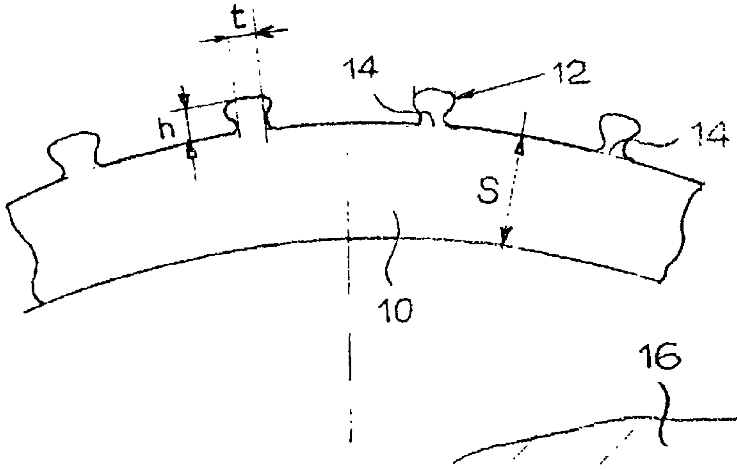
FIG. 3 is a detail on a larger scale of the part indicated by arrow III in FIG. 2.

The shape and dimensions of the protuberances 12 are determined in such as fashion to melt when they come into contact with the molten aluminium at casting temperature (≅730° C.). Preferably, each protuberance 12 presents an undercut shape with a narrower section near the external surface of the liner 10. The purpose of this narrower section is to form a preferential fusion area from where the fusion of the projecting parts starts. The external surface of the liner 10 is covered by a layer of aluminium oxide which is formed spontaneously following contact with oxygen. The layer of aluminium oxide forms a thermal barrier which protects the liner 10 from the risk of being damaged during the fusion of aluminium-based material in liquid state which is destined to form the cylinder block. The layer of alumina on the protuberances does not prevent the fusion of the protuberances because the contact surface of each protuberance with the molten material is extended and presents a fusion starting point which thickness is limited. When the protuberances 12 are melted by the liquid material cast around the liner 10, the portion of the root, indicated with number 14 in FIG. 3, is without the alumina layer and in correspondence to said areas a metallurgic bond is created between the liner 10 and the aluminium-based material forming the cylinder block, indicated by number 10 in FIG. 4.

Figure 4:
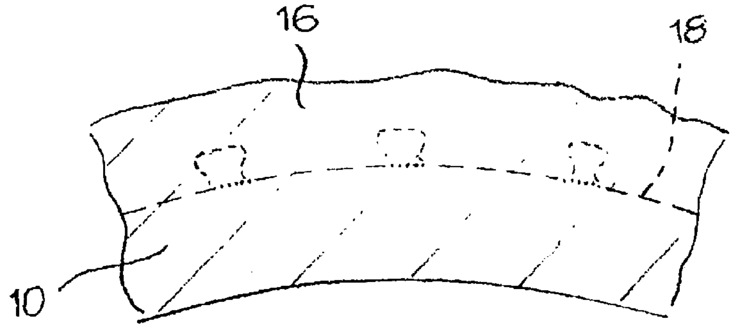
FIG. 4 is a schematic cross-section illustrating a part of the cylinder liner according to this invention incorporated in a cylinder block.

FIG. 4 schematically illustrates the contact area between a liner 10 and the material forming the cylinder block after casting and solidification of said material. The protuberances 12 are indicated with a dotted line because the protuberances have melted in contact with the cast material.

The dotted line indicated by number 18 in FIG. 4 schematically represents the layer of alumina forming a protective thermal barrier between the liner 10 and the material 16. A mechanical bond will be formed between the cylinder liner 10 and the cylinder block 16, with an air gap which is smaller than 20 microns, in the area where an alumina layer 10 is present. Conversely, a metallurgic bond without gap providing tight co-penetration of material is created in the areas where the protuberances 12 were present.

The objective is to obtain a metallurgic bond between the cylinder liner and the engine crankcase during the casting process.

The geometry of the protuberances is such to ensure that when the protuberances come into contact with the molten aluminium they soften and deform. The aluminium oxide (alumina) present on the surface of the protuberances is fragile and cannot be deformed. Consequently, the alumina cracks and detaches by effect of this deformation. Consequently, the molten aluminium comes into contact with the aluminium alloy of the liner (underneath the oxide) which favours the formation of a metallurgic bond.

Preferably, the overall surface of the areas in which the formation of a metallurgic bond is required is in the range from 5% to 50% of the overall external surface of the liner 10. Preferably, to facilitate fusion of protuberances 12, said protuberances have a height h included in the range from 30% to 60% of the thickness S of the liner 10 and a narrower section which thickness t is included in the range from 40% to 80% of height h. The undercut shape of the protuberances 12 is advantageous because a mechanical anchoring between the liner 10 and the cylinder block 16 is obtained if the fusion of the protuberances 12 does not occur.

What is claimed is:

1. A method for making a cylinder block for internal combustion engines comprising the steps of arranging at least one cylinder liner inside a mould and casting aluminum-based material into the mould and cooling the aluminum-based material so that the cylinder liner is incorporated in the cylinder block, wherein said cylinder liner is made of aluminum-based material and has longitudinal ribbing shaped protuberances arranged on an external surface of the cylinder liner which melt in contact with the molten material cast into the mould.

2. The method according to claim 1, wherein said protuberances have an undercut profile.

3. The method according to claim 1, wherein each of said protuberances has a height h which value is included in the range from 30% to 60% of the thickness (S) of the cylinder liner.

4. The method according to claim 1, wherein each of said protuberances has a root section having a thickness (t) which is included in the range from 40% to 80% of the height (h) of the protuberance.

* * * * *